(12) United States Patent
Reed et al.

(10) Patent No.: US 7,611,204 B2
(45) Date of Patent: Nov. 3, 2009

(54) ROTARY ADJUSTMENT MECHANISM

(75) Inventors: Robert J. Reed, Mackinaw, IL (US); Lyle E. York, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 506 days.

(21) Appl. No.: 11/479,291

(22) Filed: Jun. 30, 2006

(65) Prior Publication Data
US 2008/0001457 A1    Jan. 3, 2008

(51) Int. Cl.
    *B60N 2/22* (2006.01)
(52) U.S. Cl. .................. 297/362; 297/362.12; 192/66.1
(58) Field of Classification Search .................. 297/362, 297/362.12, 363–365, 378.12; 74/527, 529; 192/66.1, 66.2, 66.22, 66.23, 66.3, 66.31, 192/66.32
    See application file for complete search history.

(56) References Cited

U.S. PATENT DOCUMENTS

| | | | |
|---|---|---|---|
| 3,423,785 A | 1/1969 | Pickles | |
| 3,562,851 A | 2/1971 | Koller | |
| 3,823,440 A | 7/1974 | Klingelhofer | |
| 3,958,828 A * | 5/1976 | Ishida et al. ............. | 297/361.1 |
| 4,070,058 A | 1/1978 | Muehling | |
| 4,236,753 A * | 12/1980 | Ooshiro et al. .............. | 297/364 |
| 4,943,116 A | 7/1990 | Ohwada et al. | |
| 5,516,198 A * | 5/1996 | Yokoyama .................. | 297/362 |
| 5,685,610 A * | 11/1997 | Minai ......................... | 297/364 |
| 5,689,999 A | 11/1997 | Wiley et al. | |
| 5,918,714 A | 7/1999 | Kadereit | |
| 6,402,250 B1 * | 6/2002 | Lange .................... | 297/378.12 |
| 6,460,819 B1 * | 10/2002 | Muhlberger et al. ........ | 248/421 |
| 6,578,447 B1 | 6/2003 | Fraser | |
| 6,688,190 B2 | 2/2004 | Angermann et al. | |
| 6,719,372 B2 | 4/2004 | Glaspie et al. | |
| D508,337 S | 8/2005 | Stalmate et al. | |
| 7,296,857 B2 * | 11/2007 | Shinozaki et al. ........... | 297/365 |

* cited by examiner

*Primary Examiner*—Peter R. Brown
(74) *Attorney, Agent, or Firm*—William Beckman (57) ABSTRACT

A rotary adjustment mechanism is provided. The rotary adjustment mechanism has a first member, a second member, a first gear, a second gear, a locking gear, a spring, and a release. The first gear is rotationally attached to the first member. The second member is pivotally attached to the first member. The second gear is rotationally attached to the second member. The locking gear is moveable from a first position coupling the first gear with the second gear to a second position decoupling the first gear with the second gear. The spring biases the locking gear towards the first position. The release is coupled to the locking gear and selectively moves the locking gear to the second position.

15 Claims, 7 Drawing Sheets

Fig_6_

ROTARY ADJUSTMENT MECHANISM

TECHNICAL FIELD

This invention relates generally to a rotary adjustment mechanism, and more particularly, to a rotary adjustment mechanism for a seat.

BACKGROUND

Machines such as skid steer loaders, multi terrain loaders, backhoe loaders, agricultural tractors, track-type tractors, articulated trucks, wheel loaders, automobiles, on-highway trucks, and other vehicles typically have an adjustable seat. This adjustable seat typically uses a rotary adjustment mechanism to rotate one seat element with respect to another. A rotary adjustment mechanism in such a seat may include, for example, an eccentric coupled with a ring and a spur gear. However, such a design requires that the eccentric be turned several times through a large angle with respect to the seat, resulting in considerable effort to the user.

Another example of a rotary adjustment mechanism is disclosed in U.S. Pat. No. 5,689,999 to Wiley ("Wiley"). Wiley discloses an apparatus having two members that are relatively rotatable about an axis, with one member having a plurality of arcuately shaped locking pins that are moveable between retracted and projected positions. The other member has a plurality of arcuately shaped sockets sized to hold the projections. The arcuate spacing between adjacent pins and sockets is uniform, while the spacing between the pins differs from that between the sockets.

While both Wiley and the mechanisms having eccentrics provide a rotary adjustment mechanism, such designs are typically mounted at the side of the seat along a pivot axis, and actuated by a lever or knob that is pivotal about the pivot axis. This actuation may require additional space that may not be available in applications having limited clearance about the pivot axis and may not be suitable for applications requiring remote actuation.

The present invention is directed to overcome one or more of the problems as set forth above.

SUMMARY OF THE INVENTION

In one aspect of the present invention, a rotary adjustment mechanism is provided. The rotary adjustment mechanism seat has a first member, a second member, a first gear, a second gear, a locking gear, a spring, and a release. The first gear is rotationally attached to the first member. The second member is pivotally attached to the first member. The second gear is rotationally attached to the second member. The locking gear is moveable from a first position coupling the first gear with the second gear to a second position decoupling the first gear with the second gear. The spring biases the locking gear towards the first position. The release is coupled to the locking gear and selectively moves the locking gear to the second position.

In another aspect of the present invention, a seat is provided. The seat has a base, a seat back, a first gear, a second gear, a locking gear, a spring, and a release. The first gear is rotationally attached to the base. The seat back is pivotally attached to the base. The second gear is rotationally attached to the seat back. The locking gear is moveable from a first position coupling the first gear with the second gear to a second position decoupling the first gear with the second gear. The spring biases the locking gear towards the first position. The release is coupled to the locking gear and selectively moves the locking gear to the second position.

A third aspect of the present invention includes a method of providing a seat. The method includes the steps of providing a first member and rotationally attaching a first gear to the first member. The method also includes the step of pivotally attaching a second member to the first member. The method also includes the step of rotationally attaching a second gear to the second member. The method also includes the step of providing a locking gear that is moveable from a first position coupling the first gear with the second gear to a second position decoupling the first gear with the second gear. The method also includes the steps of biasing the locking gear towards the first position and coupling a release to the locking gear that selectively moves the locking gear to the second position.

DETAILED DESCRIPTION

Figure 1:
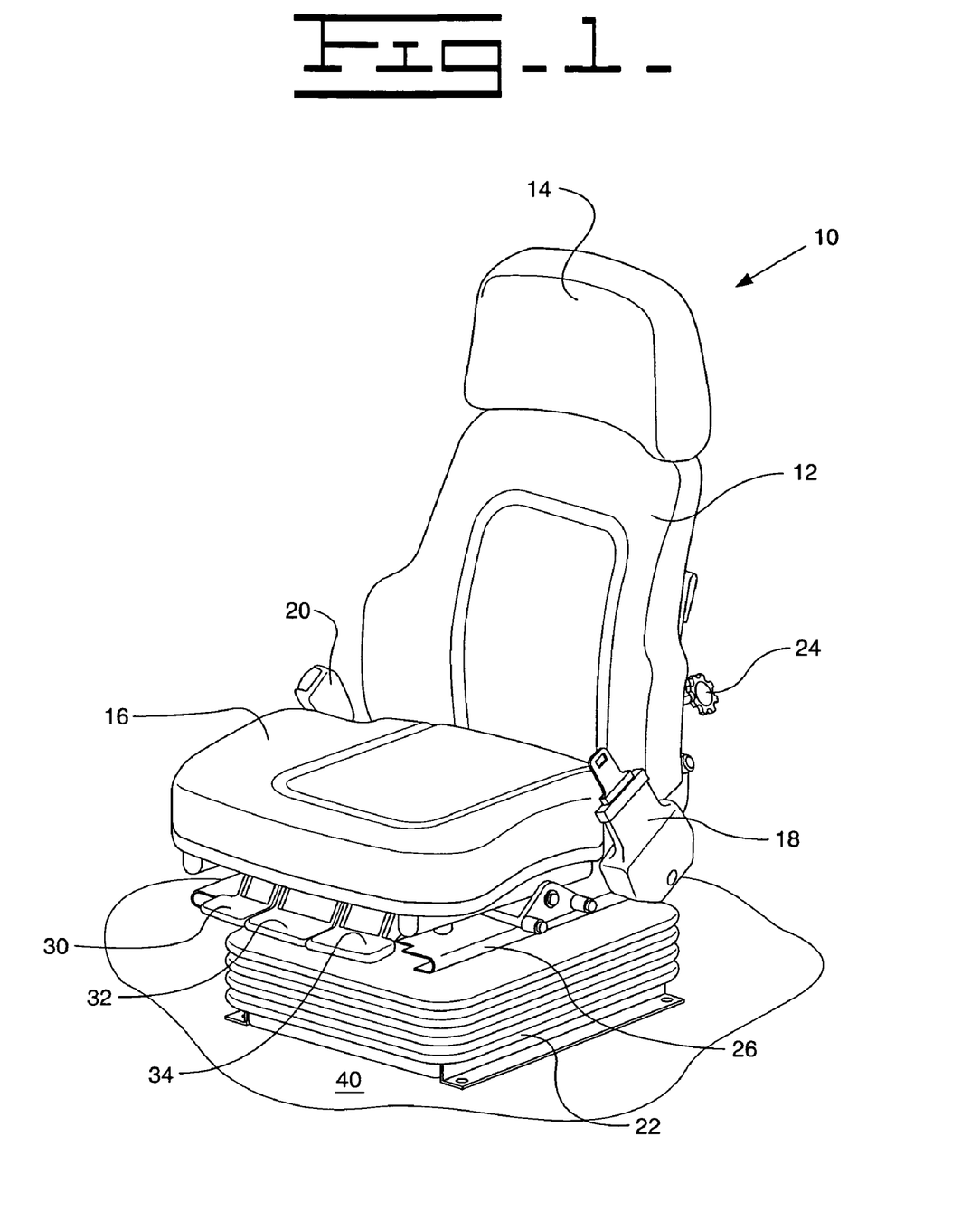
FIG. 1 is a perspective view of a seat suitable for use with the present invention.

A seat 10 in accordance with the present invention is illustrated in FIG. 1. As shown, the seat 10 includes a seat back 12, a head rest 14, a seat pan 16, a suspension system 22, a lumbar adjustment 24, a base 26, and levers 30, 32, 34. The seat 10 may be mounted to a floor 40 in an operator compartment of a machine (not shown). The suspension system 22 damps and absorbs vibrations and shocks from the machine to an occupant of the seat 10. An adjustment knob (not shown) may adjust the spring rate of the suspension system 22. The lever 32 may allow the seat 10 to slide fore and aft along the base 26 with respect to the floor 40. The seat may also include a seat-height adjustment mechanism (not shown). Alternately, the seat 10 may be fixedly mounted to the floor 40, such that the seat 30 does not move with respect to the floor 40 in either a forward direction or a transverse direction. The seat 10 may incorporate a seat belt 18 and a seat belt latch 20 to secure an operator in the seat 10, and an operator presence switch (not shown) that engages or disengages the transmission, parking brake, or engine depending on whether an operator is sitting in seat 10 or not.

Figure 2:
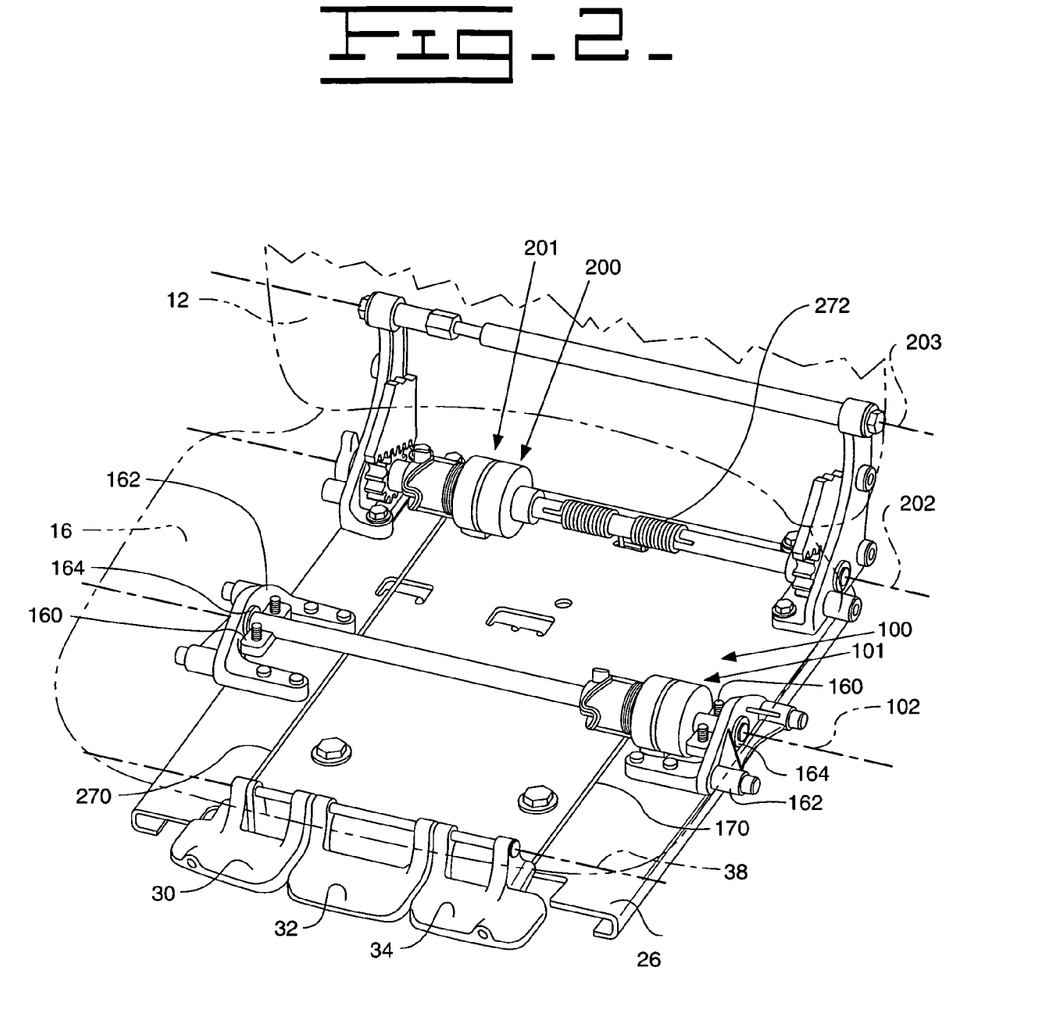
FIG. 2 is a detail perspective view of the seat of FIG. 1, with the seat pan and the seat back shown in phantom, illustrating a first and second embodiment of the rotary adjustment mechanism of the present invention.
Figure 3:
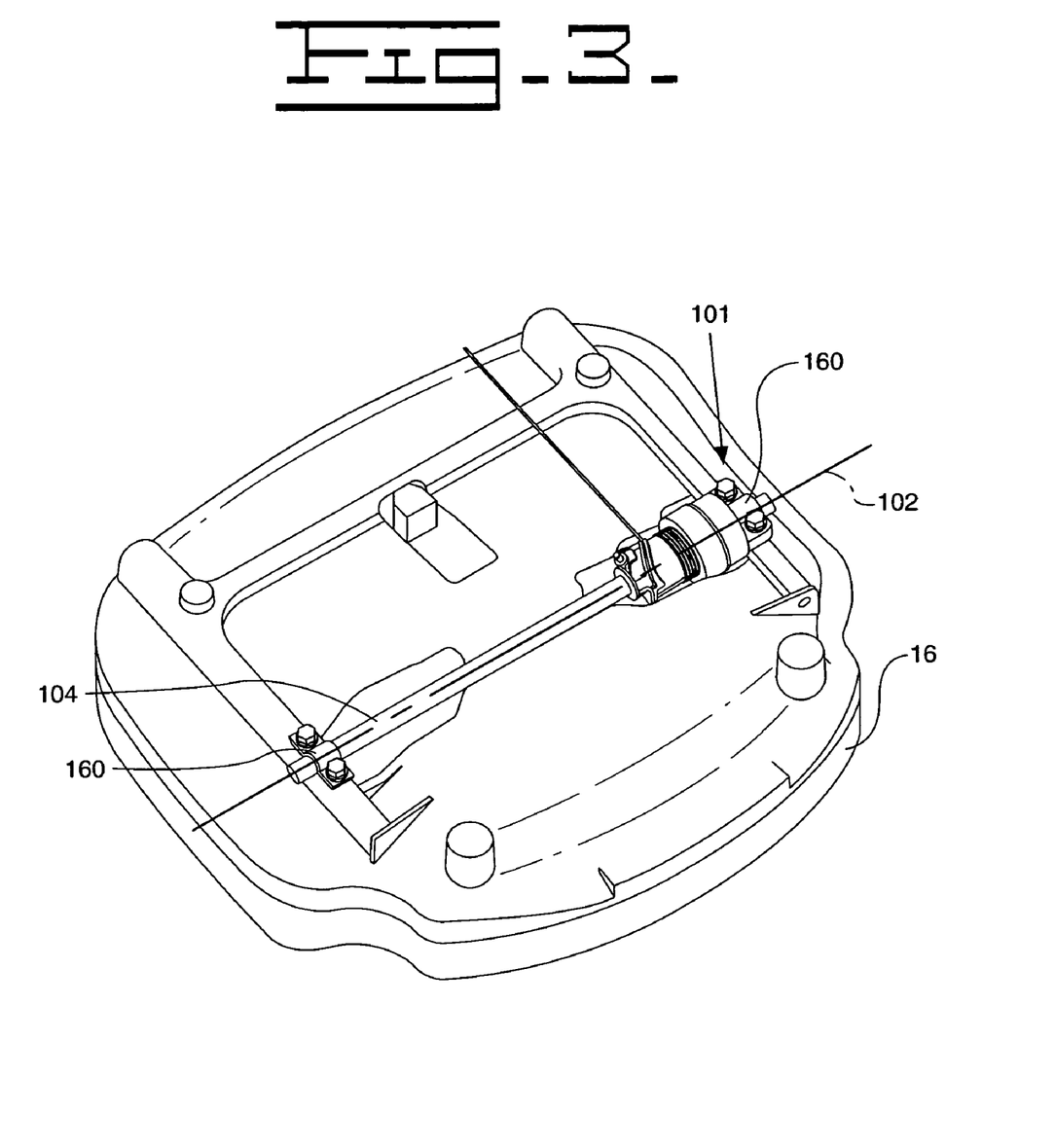
FIG. 3 is a perspective view showing the bottom of the seat pan and the first embodiment of the rotary adjustment mechanism.
Figure 4:
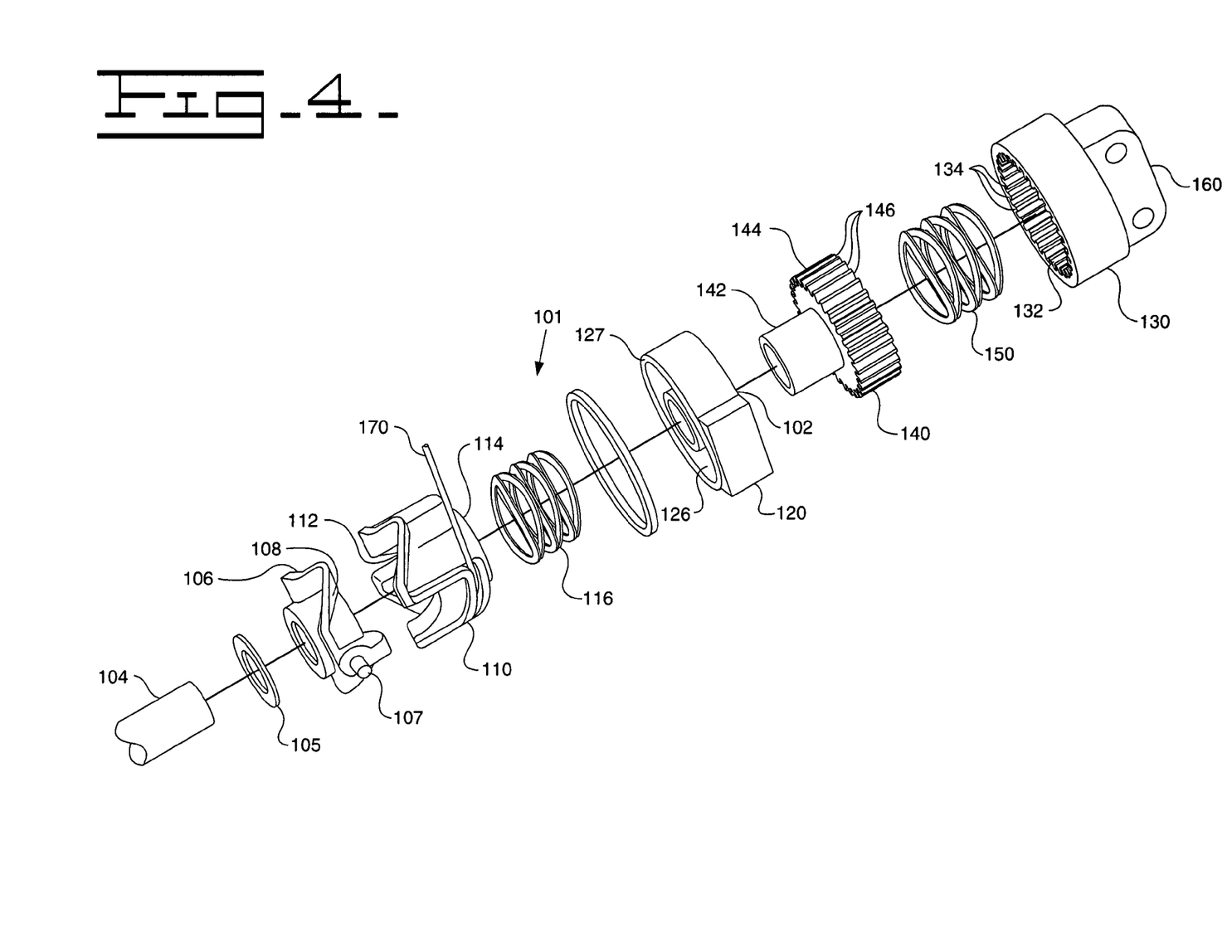
FIG. 4 is an exploded perspective view of the rotary adjustment mechanism of FIG. 3.
Figure 5:
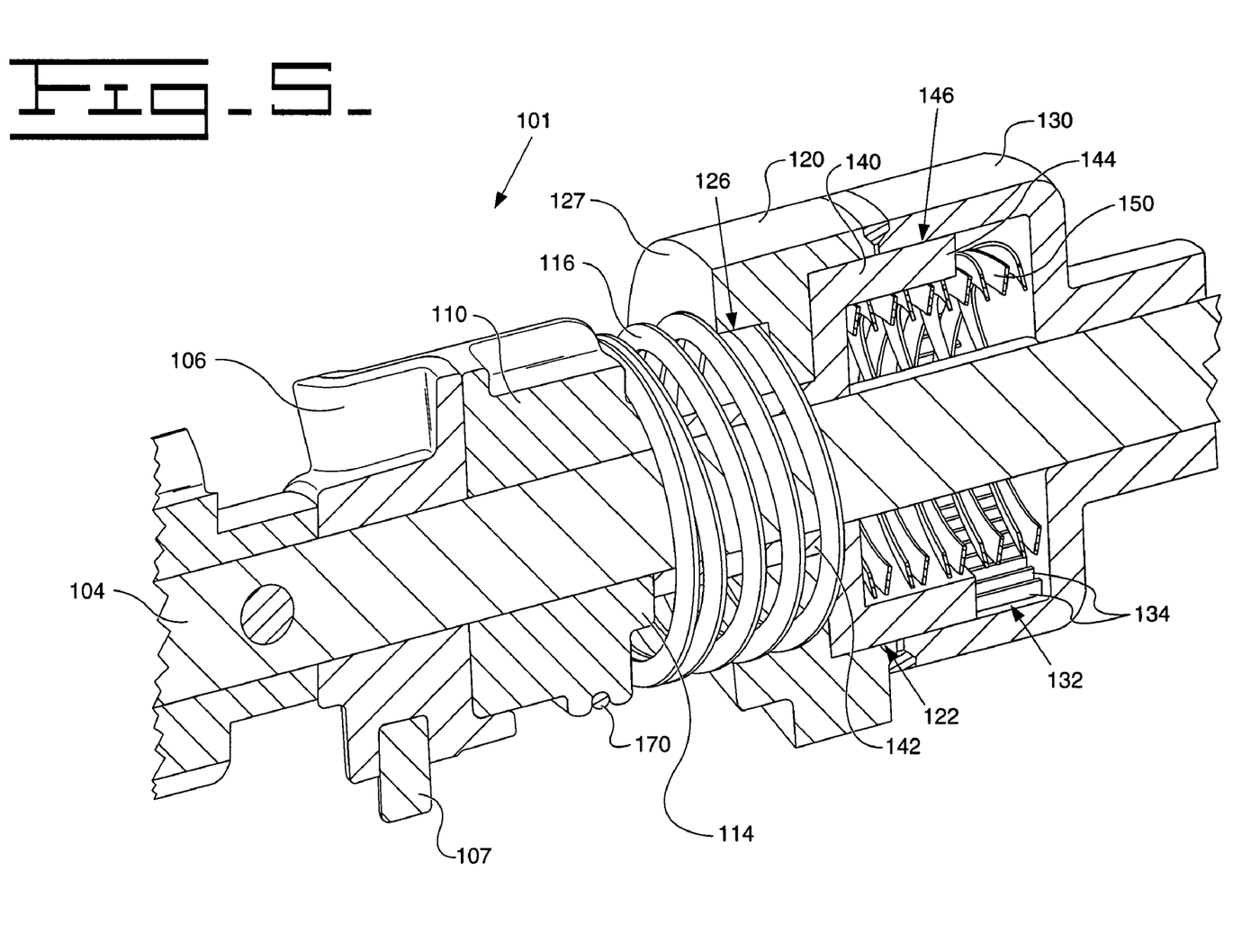
FIG. 5 is a cross section view of the rotary adjustment mechanism of FIG. 3.

As seen in FIG. 2, the seat 10 includes a seat pan tilt mechanism 100 and a seat back recline mechanism 200. The seat pan tilt mechanism 100 includes a rotary adjustment mechanism 101 that is released by the release lever 34 and allows the seat pan 16 to pivot about an axis 102 with respect to the base 26. As seen in FIG. 3, an alignment rod 104 extends axially along the axis 102 and is axially and rotatably secured to the seat pan 16 via seat pan mounting brackets 160. The alignment rod 104 is also rotatably secured and supported by the base 26 via bearings 164 (seen in FIG. 2) located within seat base mounting brackets 162. Referring now to FIGS. 4-5, the rotary adjustment mechanism 101 includes a fixed slider 106, a rotating slider 110, a first spring 116, a first outer gear 120, a second outer gear 130, a locking or inner gear 140, and a second spring 150 arranged axially along the alignment rod 104.

Best seen in FIGS. 4-5, the fixed slider 106 is mounted along the alignment rod 104 and adjacent to an axial stop 105 that prevents the fixed slider 106 from sliding along the alignment rod 104. The fixed slider 106 also includes a projection 107. The projection 107 fits within a slot or groove (not shown) in the base 26 to prevent the fixed slider 106 from rotating about the axis 102 and the alignment rod 104. The fixed slider 106 also includes a spiraled ramp 108.

The rotating slider 110 is mounted adjacent the fixed slider 106 along the alignment rod 104. The rotating slider 110 has a spiraled ramp 112 that slidably engages the spiraled ramp 108 of the fixed slider 106. The rotating slider also has an axial projection 114 extending along the alignment rod 104. A cable 170 extends from the release lever 34 and is secured to the rotating slider 110. One or both of the fixed and rotating slider 106, 110 may be injection molded from a low friction plastic, such as polytetrafluoroethylene, although other materials such as nylon, acetal, or other plastics or metals may also be used with sufficient lubrication.

The first outer gear 120 is mounted adjacent to the rotating slider 110 and coaxial with the alignment rod 104. The second outer gear 130 is mounted adjacent to the first outer gear 120 along the alignment rod 104. At least one of the seat pan mounting brackets 160 may be integrally formed with the second outer gear 130, axially and rotatably securing the second outer gear 130 to the alignment rod 104. Both the first outer gear 120 and the second outer gear 130 may have an internal bore 122, 132, with each bore 122, 132 having axial splines 134. The first outer gear 120 may also include a circumferential groove 126 mounted along the face 127 distal from the second outer gear 130.

As seen in FIG. 5, the inner gear 140 is slidably mounted along the alignment rod 104. The first outer gear 120 is slidably mounted on a first section 142 of the inner gear 140. The first section 142 of the inner gear 140 is also axial engaged by the axial projection 114 of the rotating slider 110. A second section 144 of the inner gear 140 has a plurality of external axial splines 146 that are operably coupled with the splines 134 of the first and second outer gears 120, 130. The first and second outer gears 120, 130 and the inner gear 140 may be made from a powder metallurgy forging process or any other technique known in the art. FIG. 5 illustrates the first and second outer gears 120, 130 as having ring gear portions, with the inner gear 140 having a mating spur gear. However, other configurations may also be used, such that the inner or locking gear 140 may be formed as a ring gear, with the first and second outer gears 120, 130 having spur gear portions.

One end of the first spring 116 is positioned in the circumferential groove 126 of the first outer gear 120 and biases the rotating slider 110 away from the first outer gear 120, so that the rotating slider 110 slides along the spiraled ramp 108 of the fixed slider 106 and the axial projection 114 disengages from the first section 142 of the inner gear 140. One end of the second spring 150 biases the inner gear 140 away from the second outer gear 130, such that the inner gear 140 is operably coupled with both the first outer gear 120 and the second outer gear 130. While FIG. 5 depicts first and second spring 116, 150 as wave springs, other types, quantities, or configurations of springs may also be used.

Figure 6:
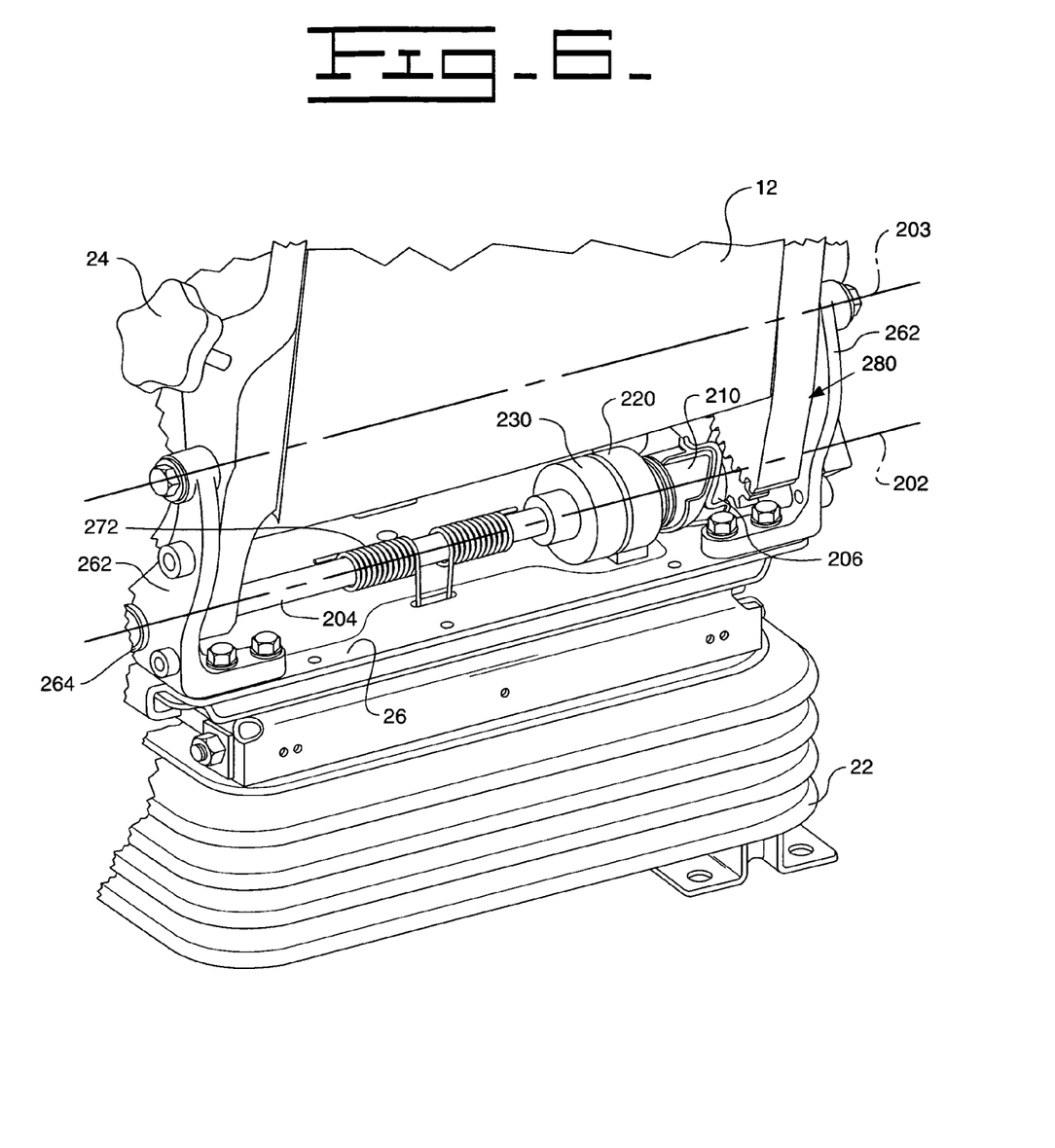
FIG. 6 is a rear perspective view of the seat of FIG. 1, illustrating the seat back and the second embodiment of the rotary adjustment mechanism.
Figure 7:
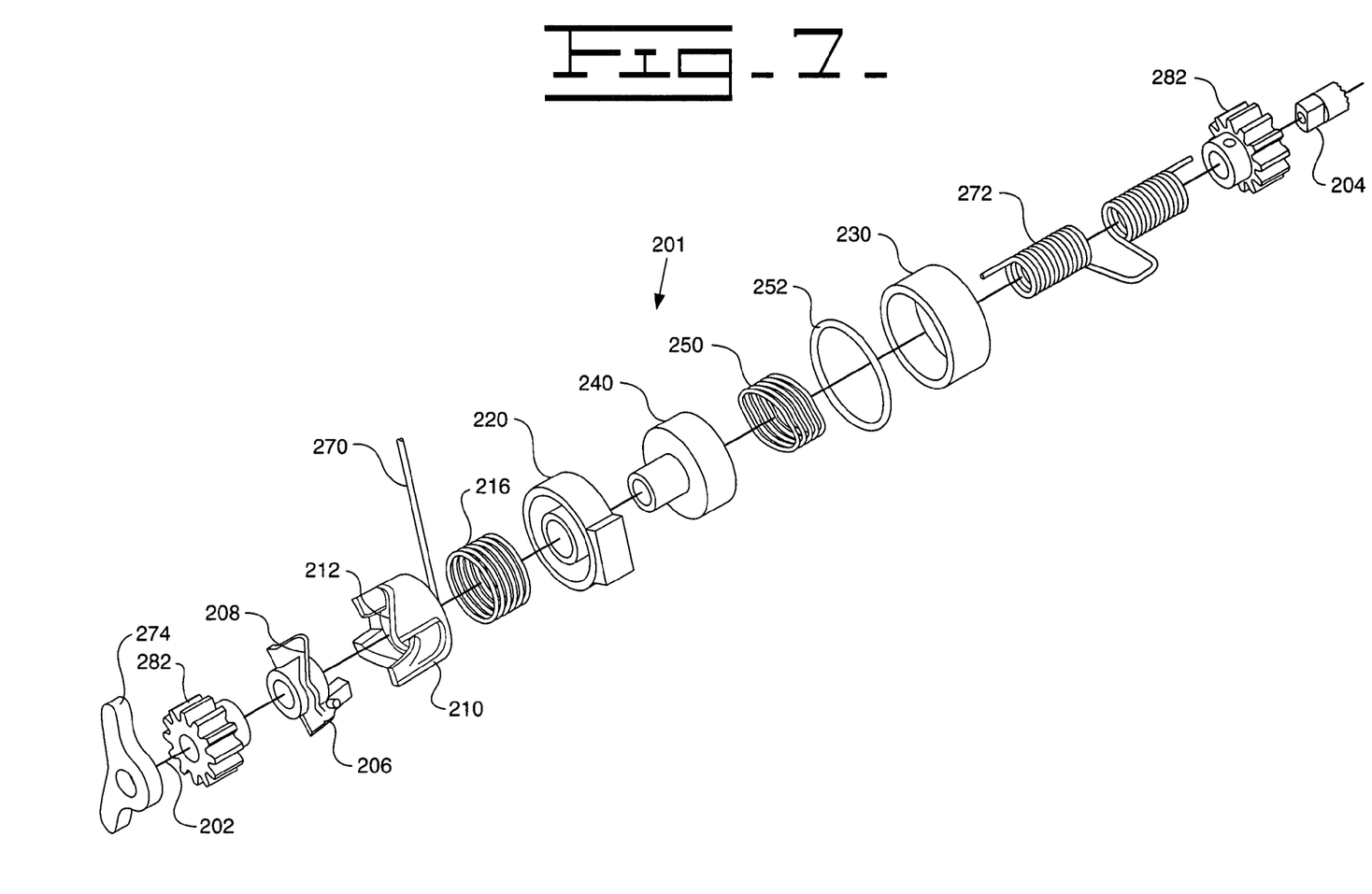
FIG. 7 is an exploded perspective view of the second embodiment of the rotary adjustment mechanism of FIG. 6.

Referring now to FIGS. 2 and 6-7, the seat back recline mechanism 200 includes a rotary adjustment mechanism 201 arranged along an axis 202. The rotary adjustment mechanism 201 is released by the release lever 30 and allows the seat back 12 to rotate about an axis 203 with respect to the base 26. The seat back 12 is coupled to the rotary adjustment mechanism 201 through a transmission 280 including a first recline gear 282 secured to the rotary adjustment mechanism 201 and a second recline gear 284 secured to the seat back 12.

Similar to the rotary adjustment mechanism 101 described above, the rotary adjustment mechanism 201 includes a fixed slider 206, a rotating slider 210, a first spring 216, a first outer gear 220, a second outer gear 230, an inner gear 240, and a second spring 250 arranged axially along an alignment rod 204. In addition, the rotary adjustment mechanism 201 also includes a torsion spring 272 and a rotary stop 274. The torsion spring 272 is rotatably secured to the alignment rod 204 and to the base 26, biasing the alignment rod 204 with respect to the base 26. The second outer gear 230 is axially secured to the rod 204, with the first outer gear 220 being rotatably secured to the base 26 through a slot and groove configuration. The alignment rod 204 is axially and rotatably secured to the first recline gear 282. The alignment rod 204 is also rotatably secured and supported by the base 26 via bearings 264 located within recline mounting brackets 262. Other details of the rotary adjustment mechanism 201 are similar to those described above and illustrated in FIGS. 2-5 for the rotary adjustment mechanism 101.

INDUSTRIAL APPLICABILITY

In operation, an operator pulls upwards on release lever 34 to adjust the angle of the seat pan 16 with respect to the base 26. This pulling motion causes the release lever 34 to pivot about a lever pivot axis 38 and pull the cable 170. This pull on cable 170 causes the rotating slide 110 to rotatably slide up along the ramp 108 of the fixed slide 106, translating laterally along the alignment rod 104. This lateral translation compresses the first spring 116 and causes the axial projection 114 to laterally push the locking or inner gear 140 from a locked position along the alignment rod 104 to an unlocked position. As the inner gear 140 slides along the alignment rod 104, the splines 146 of the inner gear 140 disengage from the splines (not shown) of the first outer gear 120 and decouple the first outer gear 120 from the second outer gear 130. When the inner gear 140 disengages from the first outer gear 120, the rotary adjustment mechanism 101 is unlocked and allows for relative rotation between the gear 120 and the gear 130, which in turn allows the seat pan 16 to rotate about the pivot axis 102 with respect to the base 26. The number of splines 134, 146 on the gears 120, 130, 140 determines the angular resolution of the rotary adjustment mechanism 101—more splines 134, 146 may allow for finer adjustments, while fewer splines 134, 146 may allow for more coarse adjustments.

After the user has set the desired seat pan tilt, the user releases the release lever 34. This releases the tension on the cable 170, causing the first spring 116 to bias the rotating slide 110 to rotatably slide down along the ramp 108 of the fixed slide 106. This disengages the axial projection 116 from the inner gear 140, and allows the second spring 150 to bias the inner gear 140 from the unlocked or decoupled position into a locked or coupled position, pushing the inner gear 140 back into engagement with both the first outer gear 120 and the second outer gear 130.

Similar to the operation of the seat pan adjustment described above, an operator pulls upwards on release lever 30 to adjust the angle of the seat back 12 with respect to the base 26. This pulling motion causes the release lever 30 to pivot about a lever pivot axis 38 and pull a cable 270. This pull on the cable 270 causes the rotating slide 210 to rotatably slide up along the ramp 208 of the fixed slide 206, translating laterally along the alignment rod 204. This lateral translation compresses the first spring 216 and causes the locking or inner gear 240 to move from a locked position and slide along the alignment rod 204 and decouple the first outer gear 220 from the second outer gear 230 to an unlocked position. This unlocks the rotary adjustment mechanism 201 and allows for relative rotation between the gear 220 and the gear 230, allowing the seat back 12 to rotate about the pivot axis 203 with respect to the base 26. As the seat back 12 rotates about the pivot axis 203, the transmission 280 transmits the rotary motion about the pivot axis 203 to the alignment rod 204 through the recline gears 282, 284. As the alignment rod 204 is rotated, the torsion spring 272 biases the alignment rod 204, such that the seat back 12 is biased towards the seat pan 16 about the pivot axis 203. The rotary stop 274 prevents the seat back 12 from rotating too far forward or back about the pivot axis 203.

Releasing the lever 30 releases the tension on the cable 270, causing the first spring 216 to bias the rotating slide 210 to rotatably slide down along the ramp 208 of the fixed slide 206. This disengages the axial projection 216 from the inner gear 240, and allows the second spring 250 to bias the inner gear 240 from the unlocked or decoupled position into a locked or coupled position, pushing the inner gear 240 back into engagement with both the first outer gear 220 and the second outer gear 230. Other details of the rotary adjustment mechanism 201 are similar to those described above and illustrated in FIGS. 2-5 for the rotary adjustment mechanism 101.

Several advantages over the prior art may be associated with the rotary adjustment mechanism 101, 201. For example, the configuration of the rotary adjustment mechanism 101, 201 allows for a compact design. In addition, the design also allows the rotary adjustment mechanism 101, 201 to be actuated from the front of the seat. However, space permitting, the rotary adjustment mechanism 101, 201 may also be actuated from the side.

Other aspects, objects and advantages of this invention can be obtained from a study of the drawings, the disclosure, and the appended claims.

What is claimed is:

1. A rotary adjustment mechanism comprising:
    a first member;
    a second member pivotally attached to the first member;
    a rod secured to the first member;
    a first gear positioned along the rod and rotationally attached to the first member;
    a second gear positioned along the rod and rotationally attached to the second member;
    a locking gear moveable along the rod from a first position coupling the first gear with the second gear and rotationally locking the second member to the first member, to a second position decoupling the first gear with the second gear and allowing relative rotation between the second member and the first member;
    a first spring biasing the locking gear towards the first position; and
    a release having a slider, the slider slidably disposed along the rod and coupled to the locking gear, and selectively moving the locking gear with the slider to the second position.

2. The rotary adjustment mechanism of claim 1, wherein the release is pivotally attached about a second axis, and wherein the rod is substantially parallel to the second axis.

3. The rotary adjustment mechanism of claim 1, wherein the first member is a seat base or one of a seat back and a seat pan and the second member is the other of the seat base or one of the seat back and the seat pan.

4. The rotary adjustment mechanism of claim 1, wherein the first and the second gear each have a hollow splined portion, wherein the locking gear is a spur gear, and wherein the locking gear is at least partially positioned within the hollow splined portion of the first and the second gears when the locking gear is in the first position.

5. The rotary adjustment mechanism of claim 1, further comprising:
    a second spring biasing the slider out of engagement with the locking gear.

6. The rotary adjustment mechanism of claim 5, wherein the first spring and the second spring are wave springs.

7. The rotary adjustment mechanism of claim 1, wherein the release has a spiral ramp positioned along the rod and the slider rotates and translates along the ramp into engagement with the locking gear when the release is engaged.

8. A seat comprising:
    a base;
    a seat back pivotally attached to the base;
    a rod secured to the base;
    a first gear positioned along the rod and rotationally attached to the base;
    a second gear positioned along the rod and rotationally attached to the seat back;
    a locking gear moveable along the rod from a first position coupling the first gear with the second gear and rotationally locking the seat back to the base, to a second position decoupling the first gear with the second gear and allowing relative rotation between the seat back and the base;
    a first spring biasing the locking gear towards the first position; and
    a release having a slider, the slider slidably disposed along the rod and coupled to the locking gear, and selectively moving the locking gear with the slider to the second position.

9. The seat of claim 8, wherein the release is pivotally attached about a second axis, and wherein the first-axis rod is substantially parallel to the second axis.

10. The seat of claim 9, wherein the seat back is pivotally attached to the base about a third axis, and wherein the third axis is substantially parallel to the rod and second axes.

11. The seat of claim 8, wherein the first and the second gear each have a hollow splined portion, wherein the locking gear is a spur gear, and wherein the locking gear is at least partially positioned within the hollow splined portion of the first and the second gears when the locking gear is in the first position.

12. The seat of claim 8, wherein the release has a spiral ramp positioned along the rod and the slider rotates and translates along the ramp into engagement with the locking gear when the release is engaged.

13. A method of providing a rotary adjustment mechanism comprising the steps of:
    providing a first member;
    securing a rod to the first member;
    rotationally attaching a first gear to the first member along the rod;
    pivotally attaching a second member to the first member;

rotationally attaching a second gear to the second member along the rod;
providing a locking gear moveable along the rod from a first position coupling the first gear with the second gear and rotationally locking the second member to the first member, to a second position decoupling the first gear with the second gear and allowing relative rotation between the second member and the first member;
biasing the locking gear towards the first position; and
coupling a release having a slider slidably disposed along the rod and coupled to the locking gear that selectively moves the locking gear to the second position with the slider.

14. The method of claim 13, wherein the first and the second gear each have a hollow splined portion and wherein the locking gear is a spur gear, and further comprising the steps of:
positioning at least a portion of the locking gear within the hollow splined portion of the first and the second gears when the locking gear is in the first position.

15. The method of claim 13, wherein the release has a spiral ramp positioned along the rod and the slider rotates and translates along the ramp into engagement with the locking gear when the release is engaged.

* * * * *